No. 783,562.

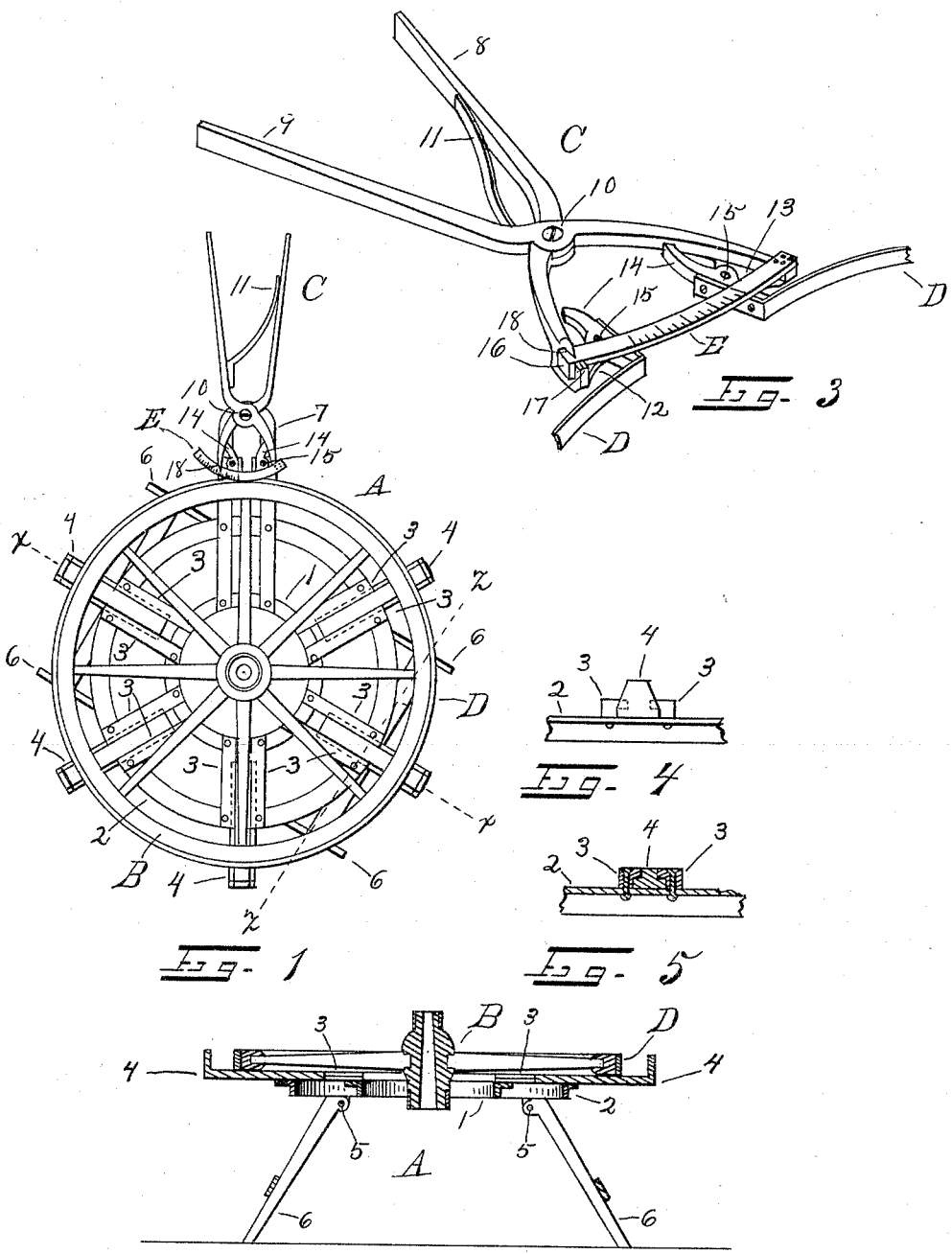

Patented February 28, 1905.

UNITED STATES PATENT OFFICE.

ANDREW A. ZIMMERMAN, OF MARSHALL, MICHIGAN.

WHEEL-SIZING DEVICE.

SPECIFICATION forming part of Letters Patent No. 783,562, dated February 28, 1905.

Application filed October 10, 1904. Serial No. 227,937.

*To all whom it may concern:*

Be it known that I, ANDREW A. ZIMMERMAN, a citizen of the United States, residing at Marshall, in the county of Calhoun and State of Michigan, have invented certain new and useful Improvements in Wheel-Sizing Devices, of which I declare the following to be a full, clear, and exact description, such as will enable others skilled in the art to which it appertains to make and use the same, reference being had to the accompanying drawings, forming a part of this specification, and to the letters and figures marked thereon as points of reference.

This invention has relation to wheel-sizing devices in which is embodied a stand, platform, or table having horizontally and radially disposed telescopic arms provided with upwardly-curved outer extremities for the reception of the wheel and an encompassing flexible band or tape adapted to lie within the curved extremities of said arms and encompass said wheel, said band being drawn taut about said wheel by means of a pair of hinged levers or tongs, each of whose jaws are secured to the opposite ends of said band pivoted to an arm of said table. The exact circumference of said wheel is ascertained by means of a quadrant bearing a scale attached to a jaw of said tongs and an indicating-finger operative from an opposite jaw passing along said quadrant as said jaws are brought together in the mode of clamping the encompassing band about the wheel to be measured; and the object of the invention is to provide a device for the purpose whereby wheels of varying sizes can be speedily and easily measured and assorted and the exact circumference be determined to a certainty without the use of a traveler or spacing-wheel.

It has been customary heretofore in ascertaining the circumference of a vehicle-wheel to employ a spacing-wheel or traveler, a means whereby much time is necessarily employed, and oftentimes the operative is forgetful or the traveler slips in making the circumference of a wheel-felly, and the result is that the wheel is either remeasured or the wheel is cast aside as correctly measured, the former process occupying much time at the best and double time if remeasured, the latter resulting in error and the possible welding of tire for a wrong-dimensioned wheel.

My invention has for its object to overcome these objections and at the same time provide a device for the purpose whereby an artisan of ordinary ability can size and assort wheels easily and speedily without previous experience.

In the drawings, Figure 1 represents a plan view of my improved wheel-sizing device with a vehicle-wheel placed and the encompassing or measuring band drawn taut in the mode of taking the circumference of said wheel. Fig. 2 is an elevation in cross-section on the line $x\,x$ of Fig. 1. Fig. 3 is a detail perspective view of the band-clamping levers or tongs. Fig. 4 is a detail end view of one of the radially-adjustable arms, and Fig. 5 is a cross-section of one of said arms on the line $z\,z$ of Fig. 1.

A represents a table, and B a vehicle-wheel. The table comprises a double annulus or two concentrically and horizontally disposed rings 1 and 2, secured together by rivets to inverted-L-shaped strips 3, radially disposed in pairs with their upper inner edges fronting, as shown, the spaces therebetween forming ways or guides for telescopic inverted-T-shaped arms 4, having upturned outer extremities, as shown. The preferred form of the rings 1 and 2 is inverted-L-shaped angle-bar, as shown. However, it will be apparent that other-style bar in cross-section could be used to advantage. The upper edges of the telescopic arms and the upper faces of said ways or guides lie in the same horizontal plane, as shown, so that when a wheel is placed thereon it will always lie flat whether said arms are or are not extended.

Hinged by bolts 5 to suitable brackets secured to the table a series of legs 6, in pairs, are provided. To one side of the table an extension 7 is provided for the reception of a pair of clamping-tongs C, and in the preferred form this extension consists of a U-shaped strip having its ends riveted to both the inner and outer rings 1 and 2 of the table. The tongs C comprise the two members 8 and 9, pivotally hinged by a stud 10, secured at the outer extremity of the support or extension 7. Between the handle members of said tongs a recoil-spring 11 is provided, its object being to throw the jaws of the tongs to a normal position after having been operated. Near the extremity of the jaws of said tongs and protruding from their lower edges inward offsets forming arms 12 and 13 are provided, both of which are adapted to receive hinged levers 14. These levers are pivoted near their centers to studs 15, their inner ends being adapted to bear against the jaws of said tongs to limit their action, their opposite ends being made fast by screws or otherwise to the ends of an encircling flexible metallic band or tape D. An object in securing the ends of the tape D to pivoted levers at the extremities of the jaws to the tongs is that said tape will not kink at the point of attachment when said jaws are operated, as it would if made rigidly thereto. Secured at the upper side and to one of the jaws comprising the tongs a graduated quadrant or arc E is attached. This arc is adapted to play through a slot provided in the jaw of the tongs opposite from which it is attached, and to limit the movement of the jaws outward said arc is bent downward to form a stop 16. At the upper extremity of the jaw, through which said arc is adapted to pass, is a radially-placed mark 17, and opposite said mark and forming a part with said jaw an indicating guide and finger 18 is provided.

The operation of my invention will in the main have been apparent from the foregoing description. To ascertain the size of a tire necessary for a wheel, the radially telescopic arms 4 are extended sufficiently to protrude beyond the felly of the wheel to be sized, the measuring band or tape D is distended, and a wheel is laid within said band upon the table. The tongs are now grasped and thrust together, by which movement the jaws to which said band is attached will close and draw said band tight about the felly of the wheel. As the jaws close the graduated gage or quadrant E passes along underneath the indicating-finger on the opposite jaw, and knowing the predetermined length of the encircling band or tape D the length indicated by said gage is added thereto, wheels of a like size being marked and placed together. It will thus be seen that by my sizing device wheels can be very readily and quickly sized without liability of mistake, as is often the case where travelers are employed for the purpose.

While the herein description covers the chief embodiment of my invention, it would be apparent that various changes in the form and minor details of construction could be resorted to without departure from the spirit or sacrificing any of the advantages thereof, and I consider myself entitled to such forms as may clearly fall within the scope and intent of the invention as set forth.

Having described my invention, what I claim as new, and desire to secure by Letters Patent, is—

1. A wheel-sizing device comprising a pair of tongs to one of whose jaws a graduated scale is affixed and adapted to play over an opposite jaw, an indicating-finger affixed to said opposite jaw, a flexible, metallic band having its ends secured to opposite ends of said jaws, respectively, and means for recoiling said tongs when compressed, for the purpose set forth.

2. A wheel-sizing device comprising a pair of tongs, the jaws of said tongs having underlying and inwardly-disposed arms, levers pivotally secured to said arms, means for limiting the movement of said levers, an arc-shaped graduated scale affixed to the end of one of said jaws and adapted to play over an opposite jaw, means to limit the throw of said scale, an indicating-finger affixed to an opposite jaw, and a flexible, metallic measuring-band having its ends secured to the opposite ends of said levers, respectively, substantially as, and for the purpose set forth.

3. A wheel-sizing device, comprising a pair of tongs, the jaws of which have underlying and inwardly-disposed arms, levers pivotally attached to the upper side of said arms within said jaws, the inward ends of said levers adapted to bear against said jaws, an arc-shaped, graduated scale secured to one of said jaws and adapted to play through a slot in an opposite jaw, an indicating-finger and an indicating-mark oppositely disposed at the sides of said slot, a flexible, metallic measuring-band having its ends secured to the opposite ends of said levers, respectively, means for limiting the throw of said scale, and means for recoiling said tongs to a normal position, substantially as, and for the purpose set forth.

4. In combination, a table having a central aperture and radially-disposed telescopic arms having upturned ends, a stationary horizontal arm projecting from said table, a spring-actuated pair of tongs pivoted to said arm, a graduated quadrant secured to one jaw of said tongs and adapted to play over an opposite jaw, an indicating-finger on said opposite jaw, a flexible steel band having its ends secured to opposite ends of said jaws, respectively and adapted to lie within the upturned ends of said radially-disposed arms, substantially as, and for the purpose set forth.

5. A wheel-sizing device, comprising a table having radially-disposed spaces and a central aperture, telescopic adjustable arms having outwardly-upturned ends adapted to work within said spaces, a stationary horizontal arm extending from said table, a pair of tongs pivoted to said arm, a graduated arc-shaped scale secured to one jaw of said tongs and adapted to play through an aperture in an opposite jaw, an indicating-finger on said opposite jaw, levers pivoted within and near the ends of said jaws, means for limiting the throw of said levers, means for recoiling said tongs to a normal position, and a flexible metallic band having its ends secured to the opposite ends of said levers, respectively and adapted to lie within the upturned ends of said telescopic arms, substantially as, and for the purpose set forth.

6. A wheel-sizing device, comprising a table having a central aperture, and radially-disposed grooves composed of oppositely and inwardly projecting strips, telescopic adjustable arms having outwardly-upturned ends adapted to work within said grooves, an annulus fastened to both the outer and inner ends below said strips to hold them rigid, a horizontal arm projecting from said table, a pair of tongs pivoted to the outer extremity of said arm, a flexible metallic band having its ends secured to opposite ends of the jaws of said tongs and adapted to lie within the upturned ends of said arms, and means for measuring the circumference of a wheel when clamped within said flexible metallic band, substantially as, and for the purpose set forth.

ANDREW A. ZIMMERMAN.

Witnesses:
L. CORTRIGHT,
H. J. CORTRIGHT.